(12) United States Patent
Belliveau et al.

(10) Patent No.: US 8,543,426 B2
(45) Date of Patent: Sep. 24, 2013

(54) SYSTEM AND METHOD FOR GENERATING AND PROVIDING A SIMPLIFIED VOLUNTARY DISABILITY PRODUCT

(75) Inventors: Mark P. Belliveau, Windsor, CT (US); Barbara S. Campbell, Longwood, FL (US); Joan Crandall, Bloomfield, CT (US); Susan Duncan, Canton, CT (US); Kim Johnson, Avon, CT (US); Lori A. Minchoff, Fiskdale, MA (US); Will Perez, South Windsor, CT (US); Alyce Roberts, Rocky Hill, CT (US); Christine T. Vujs, North Granby, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 910 days.

(21) Appl. No.: 12/004,886

(22) Filed: Dec. 21, 2007
(Under 37 CFR 1.47)

(65) Prior Publication Data
US 2009/0112632 A1   Apr. 30, 2009

Related U.S. Application Data

(60) Provisional application No. 61/000,532, filed on Oct. 26, 2007.

(51) Int. Cl.
*G06Q 40/00* (2012.01)

(52) U.S. Cl.
USPC .................................................. 705/4; 705/35

(58) Field of Classification Search
USPC ........................................................ 705/35, 4
See application file for complete search history.

(56) References Cited

U.S. PATENT DOCUMENTS

| | | | |
|---|---|---|---|
| 6,343,271 | B1 | 1/2002 | Peterson et al. |
| 7,113,913 | B1 | 9/2006 | Davis et al. |
| 7,395,217 | B1 | 7/2008 | Stevens et al. |
| 7,584,109 | B1 | 9/2009 | Allsup |
| 2004/0049397 | A1 | 3/2004 | Leisure et al. |
| 2005/0182660 | A1 | 8/2005 | Henley |
| 2006/0155590 | A1 | 7/2006 | Graham |
| 2007/0021986 | A1* | 1/2007 | Cheung et al. ............ 705/4 |
| 2007/0250427 | A1* | 10/2007 | Robinson ............ 705/36 R |
| 2008/0177580 | A1 | 7/2008 | Gabriel |

FOREIGN PATENT DOCUMENTS

| | | |
|---|---|---|
| EP | 1081623 A2 | 3/2001 |
| GB | EP1081623 A2 * | 3/2001 |

* cited by examiner

*Primary Examiner* — Ojo O Oyebisi
(74) *Attorney, Agent, or Firm* — Howard IP Law Group, PC

(57) ABSTRACT

Disclosed is a novel disability insurance product that provides a benefit to the purchaser. The insurance product comprises a disability insurance product which offers coverage for a predetermined limited period of time. If at the end of the predetermined period of time the insured individual is still disabled according to the terms of the insurance product, the insurance provider will pay a lump sum benefit.

23 Claims, 9 Drawing Sheets

SYSTEM AND METHOD FOR GENERATING AND PROVIDING A SIMPLIFIED VOLUNTARY DISABILITY PRODUCT

CROSS-REFERENCE TO RELATED APPLICATIONS

This application claims priority to application Ser. No. 61/000,532, filed Oct. 26, 2007.

FIELD OF THE INVENTION

The present invention generally relates to the field of insurance. More specifically, the present invention relates to the creation and provision of an improved insurance product which can be utilized to provide coverage for a disabling event for a predetermined period of time.

BACKGROUND OF THE INVENTION

Individuals purchase insurance products for a variety of reasons, whether it is to ensure payment of funeral services, to provide additional income to the individual's family in case of an accident, or to provide financial security to a loved one. Consequently, there are a variety of different types of insurance products available for purchase.

Disability insurance protects the insured against any loss of income attributable to an accident that renders an insured incapable of working, or limiting the capacity of the insured to work. Additionally, accident insurance protects individuals against the risk of financial loss resultant from an accident. The structure of most common insurance policies is as follows, the insured individual pays a pre-determined premium for a specified amount of coverage. The difference between the forms of coverage lies in the different events that are covered by each type of insurance.

Some of the top reasons for becoming disabled are suffering an injury while working, suffering an injury outside of work or developing a disease. Thus, an important form of disability insurance is that provided through employers to cover their employees. There are several subtypes that may or may not be separate parts of the benefits workers' compensation and more general disability insurance policies.

In general, the younger and healthier a person is, the cheaper it is to obtain accident insurance, disability insurance, and the like. Conversely, it is more expensive for an older individual to purchase these types of policies. As a result, the various policies covering serious accidents and disability have greatly varying premium payments and payouts.

Workers' compensation insurance pays benefits to employees who become unable to work because of a job related injury. However, workers' compensation is in fact more than just income insurance, because it may pay compensation for economic loss (i.e. reimbursement or payment of medical and like expenses), general damages for pain and suffering, and benefits payable to the dependents of workers killed during employment.

General disability insurance offers payments to employees who are unable to work or who are limited in their ability to work because of any injury or illness, even if it is not job-related. Additionally, in some instances general disability insurance may be offered at a negotiated group rate (i.e. as an employer or association sponsored benefit). Meaning, that the benefits of such a policy are similar to what an individual would buy, but they are purchased with a volume discount price.

These general types of disability policies tend to offer rather basic coverage essentially because most people prefer not to purchase any more coverage than they feel they have to, due to increased costs.

Individuals whose employers do not provide benefits, and self-employed individuals who desire disability coverage, may purchase their own policies. Premiums and available benefits for individual coverage may vary considerably between different companies, and for individuals in different occupations. In general, premiums are higher for policies that provide higher monthly benefits, pay the benefits for a longer period of time, and start payments of benefits more quickly following a disability. Premiums also tend to be higher for policies that define disability in broader terms, meaning the policy would pay benefits in a wider variety of circumstances.

In certain circumstances an individual may still be disabled upon the expiration of the maximum duration of benefits and thus unable to financially provide for him or her self as well as any possible dependents. In such circumstances the individual may still fit the qualifications of disability set forth in the insurance contract, however since the duration of benefits is expired the individual will receive no further benefits. Under standard disability plans known in the art, once the maximum duration of benefits has been exhausted, no further payment would be due to the insured individual.

In general, many employers do not offer disability insurance. However, now and in the future, disability insurance will prove to be a valuable asset to offer employees.

SUMMARY OF THE INVENTION

The present invention provides a system and computer implemented method for providing an insurance product to an individual or group comprising a generating module for generating an insurance product contract wherein the insurance product contract provides coverage to an individual or group for at least one event defined in the insurance product contract, a payment module for making periodic payments to the individual or group in the instance of the one event and for making a payment of a sum upon the expiration of the periodic payments, a beneficiary module for choosing a beneficiary to receive payments from the insurance provider in the instance of the individual's death and a dependent module for offering the insurance product to said individual's or group's dependents.

The event is at least one of the following: a disabling event, death, an illness, a critical illness, cancer, dismemberment, loss of hearing, loss of sight and any event rendering the individual limited ability to work or possibly unable to work entirely.

The insurance product may be subsidized at least in part by an employer and the sum is a predetermined single sum or a multiple of the periodic payments.

Accordingly, an object of the present invention is to provide a lower cost, simplified, voluntary disability product for consumers/employees that do not currently have disability coverage.

Another object of the present invention is to provide an affordable disability insurance product to companies that do not offer group disability insurance coverage to any of its employees or to sponsoring association or affinity organizations which wish to offer group disability coverage to their members or to consumers.

Still another object of the present invention is to provide an affordable disability insurance product to companies that do not offer group disability insurance coverage to certain employees (e.g. part-time, blue collar, hourly, low wage earners, etc.).

Yet another object of the present invention is to provide a disability insurance product which is simple for both the insurance provider and employer to administer and easy for employees to understand, given other commitments on their time.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION

Figure 1:
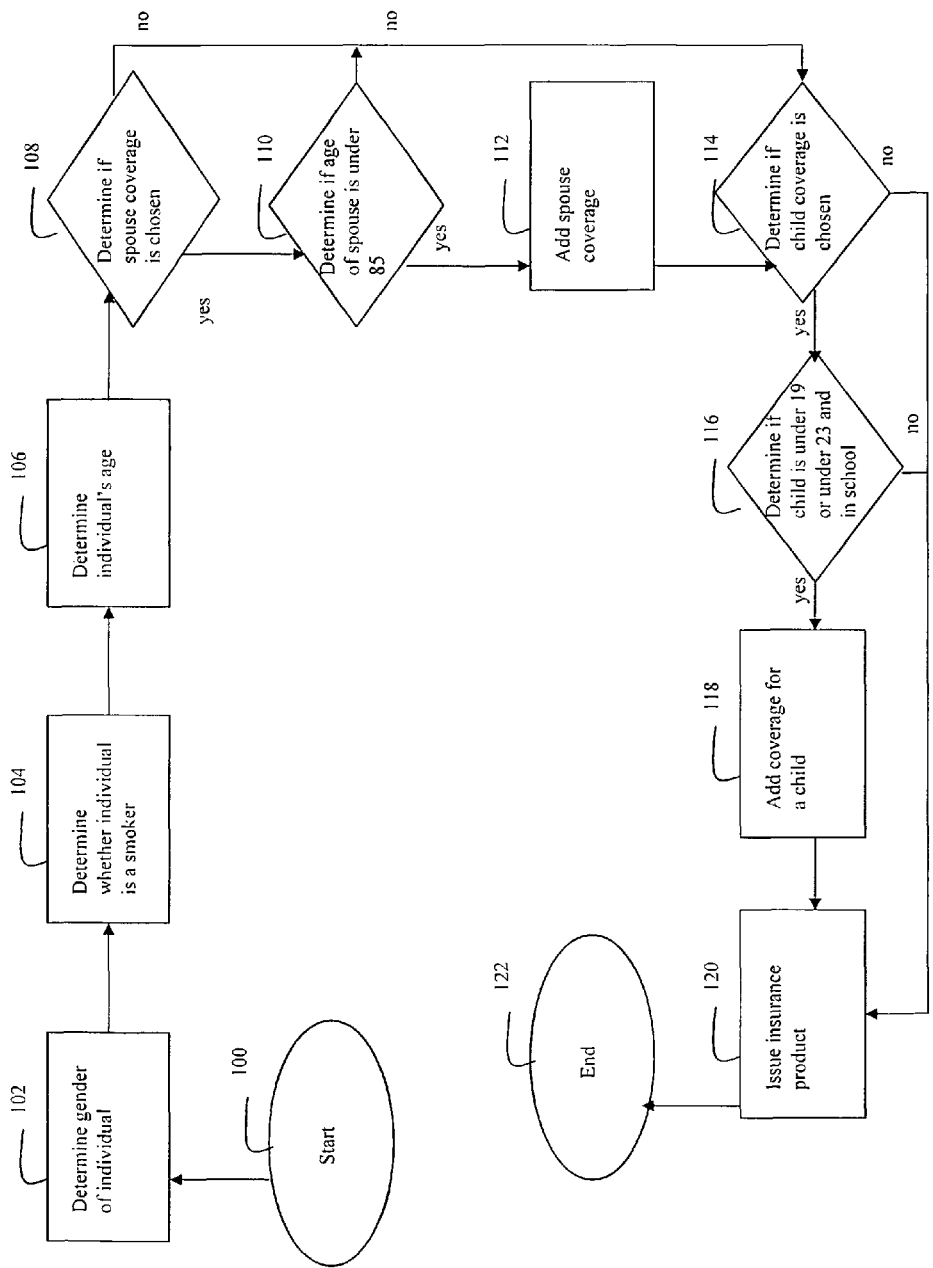
FIG. 1 is a flow chart depicting the steps of generating and offering an insurance product in accordance with an embodiment of the present invention.

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "product", "insurance policy", "policy", "insurance instrument", "insurance", "disability insurance", "accident insurance" and "insurance product" are meant to limit the application of the invention to one type of insurance instrument. The terms are used interchangeably for convenience and are not intended to limit the scope of the invention.

Similarly, the use of the terms "company", "individual", "purchaser", "member", "consumer", "insured", "insured individual", "group", "person", "claimant", "employee", "covered employee", "client", and "corporation" are not meant to limit the scope of the invention to one type of entity, as any entity or individual can also utilize the present invention.

Additionally, the use of the terms "insurance carrier", "insurance provider", "policy issuer", "insurance institution", and "insurer" are not meant to limit the scope of the invention to one type of entity. The terms are used interchangeably for convenience.

Finally, the use of the terms "disability", "disabling event", "critical illness", "cancer coverage", "accidental injury", "injury", "covered event", "coverage category", and "accident" are also not meant to limit the scope of the invention as the present invention can be applied to multiple types of insurance options. The following presents a detailed description of a preferred embodiment of the present invention.

Because there is currently no form of disability insurance that offers financial support to an individual and mitigates financial hardship due to a serious accident, or disability upon the expiration of the benefits period there is a clear need in the art for such an insurance product which incorporates this feature.

The present invention offers a unique feature, namely, once the maximum duration of benefits is reached, if the insured remains disabled according to the terms of the contract, an additional lump sum indemnity benefit (transition benefit) will be payable.

This additional lump sum benefit is designed to provide financial support to the insured individual when the disability income benefit payments cease, and to fill a gap during the transition period which may occur as that individual determines what their options are with respect to securing another income stream.

The present invention overcomes the various deficiencies associated with the prior art by creating a novel insurance product that provides the purchaser with protection against a serious accident or disability, as well as financial support beyond the expiration of the benefits period set forth in the insurance policy.

In the preferred embodiment of the present invention, a disability insurance product offers coverage for a predetermined limited period of time (e.g. 24 months). If, at the end of the predetermined maximum duration of benefits, the insured individual is still disabled according to the terms of the contract, the insurance provider will pay a lump sum benefit equal to a predetermined multiple of the insured individual's gross benefit payment (e.g. 3 times periodic gross benefit payment).

For example, if an insured individual becomes disabled under the terms of the disability insurance, the insured individual is paid a $1,000 benefit for 24 months. If upon the expiration of the 24 month duration of benefits, the insured individual has not fully recovered from the disability and continues to meet the definition of disability set forth in the contract associated with the insurance product, then the transition benefit would pay a lump sum to the insured individual of $3,000. Under a standard disability plan known in the art, once maximum duration of benefits has been exhausted, no further payment would be due to the insured individual, thus the obligation of the insurance provider under the contract would have been fulfilled.

The above example simply illustrates one scenario of the present invention and should not serve to limit the scope of the present invention. More specifically, the specificity of the example should not limit the invention to a 24 month period or $1,000 payments or a $3,000 lump sum payment, as these values can vary from each generated disability insurance product of the present invention.

The present invention is designed with a transition benefit, so the transition benefit may provide the insured individual with a 3 month window of time once the benefit payments end to determine how they will provide financially for themselves as well as any relevant dependents going forward. The insured individual could also return to full-time work after the lump sum has been paid out. It is conceivable that the insurance provider may also offer an appeals process in order for the insured individual to continue receiving monthly payments, to receive the lump sum payment and to receive benefits once the maximum duration of benefits has been exhausted.

The present invention is intended to provide a low cost simplified disability insurance which includes a disability income plan, targeting the consumer in the voluntary worksite market. This target market could be small groups which were previously unable to offer any disability insurance coverage at group rates to their employees, or to larger groups who do not offer disability insurance coverage to certain classes of their employee population. The present invention is especially useful to currently uninsured employees, as well as employers who would like to be able to underwrite employees such as part-time employees (i.e. at least 20 hours per week), blue collar employees, uninsured lower wage earners in a corporate environment, etc. The present invention can also be targeted to consumers in the association and affinity group markets, which may or may not have previously offered disability insurance coverage to their members or consumers. This product may be used as a stand alone insurance policy or as a rider to an already existing policy.

Furthermore, the present invention is designed to include specified disease coverage. Specified disease coverage is designed to provide an additional means of financial support to an individual who is diagnosed with a critical illness. This feature may take on a variety of forms, and may pay indemnity benefits for certain triggering events, and/or also provide an income stream for a specified period of time. A unique feature of the present invention is a final payment benefit, which is payable upon the earlier of the following: the date the insured dies, if they have received any benefit under the policy, or a predetermined period of time (e.g. 24 months) from the date the first payment under the policy was paid. This feature is meant to assist the individual as they transition from receiving benefits under this policy to no longer having this additional source of financial protection (i.e. insurance).

The disability product mitigates, or in some instances, eliminates, financial hardship due to a serious accident or disability. The present invention may be structured as a stand alone insurance policy or as a rider to a separate insurance policy.

The present invention is intended to accommodate the needs of companies that do not offer group disability insurance coverage to any of its employees but wish to do so, or to sponsoring association or affinity organizations which wish to offer group disability coverage to members or consumers, companies that do not offer group disability insurance coverage to certain employees (e.g. part-time, manual labor, hourly, low wage earners, etc.), but wish to do so, as well as companies that already offer some sort of disability insurance for employees but would benefit from an additional and/or supplemental disability insurance product.

This product is useful to employees or consumers that do not have any disability insurance currently, either through their employer or purchased on their own. Eligible employees or consumers will generally work 20 hours a week or more, with the exception of temporary or seasonal employees. However, the present invention may be extended to temporary or seasonal employees if needed for a particular implementation of the methods and systems described herein.

The present invention may be provided as an employer or sponsoring association or affinity organizations provided benefit, a rider to an underlying policy or a stand alone policy. If the present application is provided as an employer provided benefit the employer may at least in part participate in the administration of the insurance product of the present invention. If the insured individual terminates his or her relationship with master policyholder (i.e. spouse divorced from insured employee, insured individual laid off by employer, insured individual no longer a member of an association or affinity group offering the insurance product to their members), and meets pre-established set of criteria as outlined in the master policy, the insured individual may apply for coverage under a carrier sponsored group conversion or portability policy. Alternatively, coverage may be continued under the master policyholder's contract for a specified period of time with the payment of a premium.

The insured individual may pay 100% of the cost of the disability insurance coverage, but at a lower cost (e.g. $10-25 per month) than if they purchased it on their own or outside of work. Additionally, premiums may be paid through payroll deduction. Alternatively, premiums may be paid either by the employer without deducting from the insured individual's pay or directly by the insured individual. However, any other premium payment may be utilized without departing from the spirit of the present invention.

The insurance product of the present invention covers non-occupational disabilities, namely disabilities incurred outside of work. However, it is contemplated that the methods of the present invention may be extended to disabilities incurred at work and relating to occupational hazards.

The insured individual does not have to be totally disabled to receive benefits. The insurance product of the present invention may be utilized if the insured individual is unable to perform one or more of the essential duties of their own occupation, and if the earnings of the insured individual are less than 80% of pre-disability earnings. The percentage can of course vary depending upon a particular situation. In the preferred embodiment, the pre-disability earnings do not include overtime, bonuses or commissions. However, other implementations of the present invention may include additional earning such as overtime, bonuses, commissions, or any other earning which are not generally considered to be part of a predetermined salary.

The benefits may be elected from a choice of flat dollar amounts (e.g. $1,000 monthly benefit). Further, in the preferred embodiment, the insured individual may be given the choice of electing a 30 or 60 day elimination period. Wherein, the elimination period is the period beginning at the point of the disabling event during which an insured individual is not eligible to receive benefits even if an otherwise covered event (e.g. disability, illness, etc.) takes place, at the end of the elimination period if the insured individual remains disabled the insured individual becomes eligible to receive benefits. If for example, the elimination period is 60 days and the insured individual becomes disabled, benefits are not dispersed for the first 60 days of the disability, if upon the expiration of the 60 days period the insured individual continues to meet the qualifications for disability according to the present invention the benefits are dispersed. Importantly, other elimination periods may be used with the methods disclosed herein without departing from the spirit of the present invention.

If the insured individual becomes disabled under the policy, the benefits would begin after the elimination period and would be paid for up to 2 years. At the end of the 2 years, if the insured individual is still disabled, the individual will be paid an additional benefit, in a lump sum. Even though the above example describes a 2 year time period, this is done for illustrative purposes only, any time period shorter or longer, may be used without departing from the spirit of the present invention. The lump sum part of the benefit may be equal to 3 times the monthly benefit (e.g. $3,000 if the monthly benefit elected was $1,000); however other amounts of time and money may be used without departing from the spirit of the present invention.

In the preferred embodiment the insurance product of the present invention may include: support and assistance to return to work if the insured individual is able to do so, and assistance in applying for benefits under the federal Social Security Disability Income (SSDI) program if applicable. Other benefits and services not described herein may be added to the present invention without departing from its inventive spirit.

The present invention includes a survivor income benefit, payable to the insured individual's survivors if the insured individual dies while disabled. In the preferred embodiment, the survivor income benefit may be 3 times the monthly benefit; however other benefit amounts may be used without departing from the spirit of the present invention. The monthly benefit amount will not be reduced as a result of receiving income from other sources while disabled such as sick pay, state provided disability benefits, or income from Social Security.

Furthermore, the insurance product of the present invention may include a return to work financial incentive. Namely, if the insured individual is able to work in a limited capacity, but still qualifies as disabled, the insured individual may receive up to 100% of their pre-disability income through a combination of benefits and work earnings, thus creating a financial incentive for the insured individual to return to work.

Typically, this total amount (i.e. disability benefits and limited capacity work earnings) is higher than if the insured individual received disability benefits only. If the total amount of work earnings and benefits paid under the policy exceed 100% of the employee's pre-disability income, benefits may be reduced.

The insurance product of the present invention may include a benefit limitation for pre-existing conditions for the first 12 months of the coverage; however other amounts of time may be incorporated without departing from the spirit of the present invention. The policy may pay a benefit for 1 month if the employee is disabled and the disabling condition is found to have been pre-existing. Wherein, a condition is viewed as pre-existing if the employee received medical care for the condition in the 3 months prior to the effective date of coverage. If the employee does not become disabled within the first 12 consecutive months of coverage, the pre-existing condition limitation no longer applies, and all conditions would be eligible for full benefits; again other amounts of time may be incorporated without departing from the spirit of the present invention.

FIG. 1 depicts the steps of generating and offering an insurance product by the insurance provider in accordance with one embodiment of the present invention. The procedure starts in step 100, then the gender of the individual seeking insurance is determined in step 102, next it is determined if the individual is a smoker in step 104. The individual's age is determined in step 106, subsequently it is determined if spouse coverage is chosen in step 108. If spouse coverage is not chosen, steps 110 and 112 are skipped and step 114 is performed, if spouse coverage is chosen it is determined if the age of the spouse is under 85 in step 110.

If the age of the spouse is determined to not be under age 85, step 112 is skipped and step 114 is performed, if the age of the spouse is under age 85, spouse coverage is added in step 112. Next, it is determined whether child coverage is chosen in step 114. If child coverage is not chosen, steps 116 and 118 are skipped and step 120 is performed. However, if child coverage is chosen it is determined that the child is under the age of 19, or under the age of 23 and in school in step 116. If the child is determined not to be under the age of 19 or under the age of 23 and in school step 118 is skipped and step 120 is performed, if the child is determined to be under 19 or under 23 and in school, child coverage is added in step 118. The insurance product is then issued in step 120 and the procedure ends in step 122.

Importantly, the above figure discusses specific ages, time periods, and pre-existing conditions for illustrative purposes only, these lists should not be considered exhaustive or limiting, as the present application can be applied to nearly every age, time period, and pre-existing condition, without departing from the spirit thereof.

Additionally, the disability insurance product of the present invention may not include child or spouse coverage, the steps related to choosing child and/or spouse coverage may not be performed when generating and offering a disability insurance product by the insurance provider. However, such steps may be performed for the disability insurance product without departing from the spirit of the present invention, if a specific implementation of the methods described herein calls for such features to be included.

The insurance provider, as well as any relevant contracted third party administrator, manage and distribute the insurance product of the present invention. Information regarding insured individual's policies may be entered in the insurance provider's and/or any relevant contracted third party administrator's front end administrative systems. Bills are generated by the insurance provider or contracted third party administrator and sent to the insured individuals, employer or third party administrator. Premiums may be received directly by the insurance provider, or received by contracted third party administrator and then remitted to the insurance provider, as either gross premium or premium net of commissions and/or administration fees. The insurance provider issues contracts to the policy holder (e.g. employer, head of household, etc,) and individual certificate holders (i.e. the insured individual).

When an individual wishes to enroll in the insurance product of the present invention, the individual will fill out enrollment forms. Enrollment forms may be available through an internet based application, as a hard copy requested through various mediums (e.g. internet based application, call center, etc.) received via FedEx, United Parcel Services, United States Postal Service and the like and/or through the employer's Human Resources Department.

Enrollment forms are completed by the individual with or without assistance from an insurance provider and/or a contracted third party administrator. The insurance provider and/or a contracted third party administrator screen enrollment forms for completeness, follow up with the individual to obtain missing information (if applicable) and determine if the individual meets the initial underwriting criteria, which may consist in part of medical questions and/or verification of BMI, and/or obtain report from Medical Information Bureau (MIB) and/or validation from outside sources of insurability of the individual.

If the initial underwriting criteria are not met, the applicant may be denied coverage. If it is determined that additional medical evidence will be required before the application for coverage can be approved, the insurance provider and/or contracted third party administrator notifies the applicant, and provides appropriate forms for the applicant and/or applicant's physician's office to complete and to submit back to the insurance provider as medical proof of insurability.

The insurance provider then evaluates the forms submitted by the individual which contain additional proof with respect to medical evidence of insurability. If proof is acceptable to the insurance provider, the application for coverage is accepted. If proof is not acceptable to the insurance provider, coverage applied for may be denied.

Figure 2:
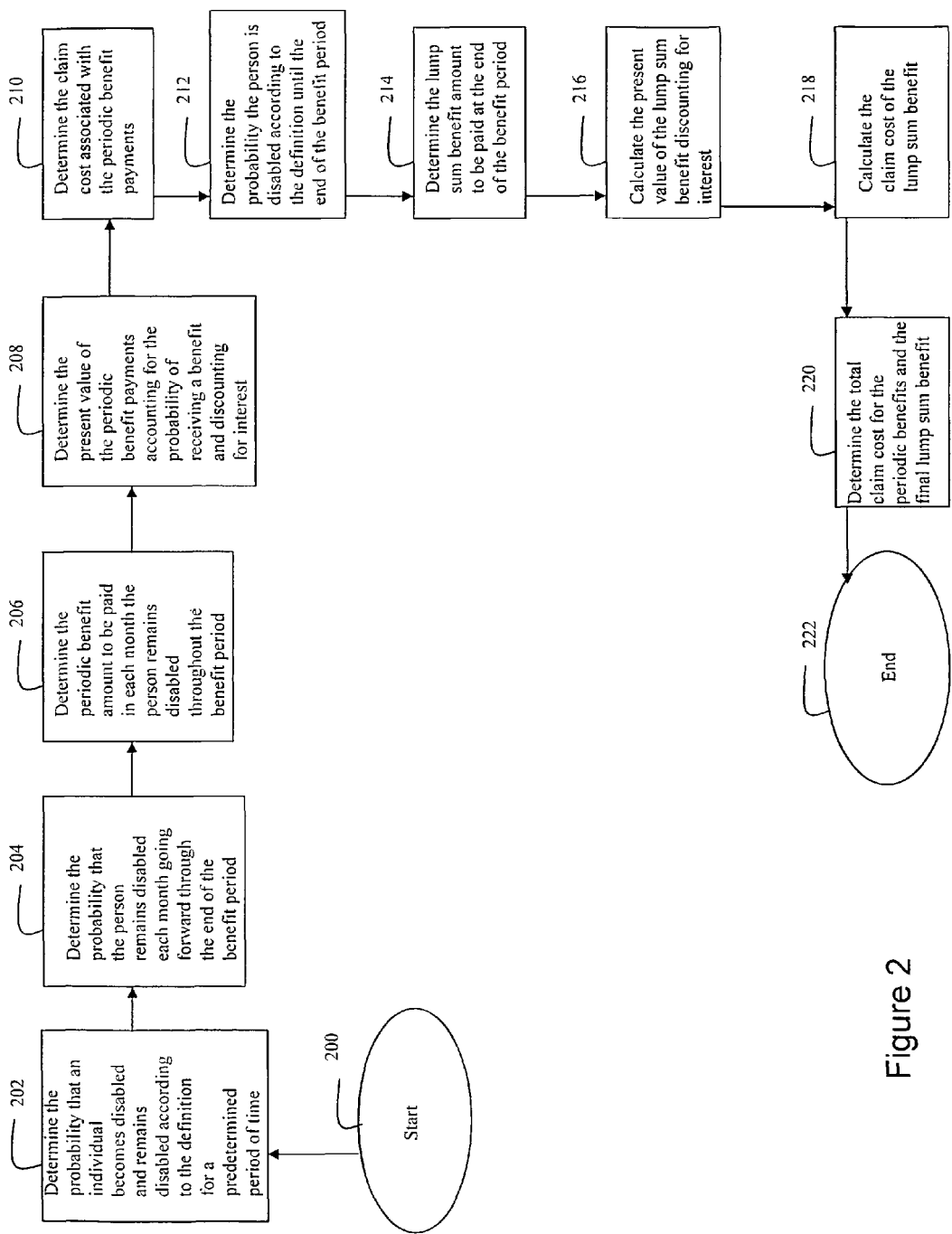
FIG. 2 is a flow chart depicting the steps taken when pricing a simplified disability benefit in accordance with an embodiment of the present invention.

FIG. 2 depicts the steps taken when pricing a simplified disability benefit by the insurance provider in accordance with the present invention.

The procedure starts in step 200, then the probability that an individual becomes disabled and remains disabled according to the definition for a predetermined period of time (i.e., satisfies the elimination period) is determined in step 202. Next the probability that the person remains disabled each month going forward through the end of the benefit period is determined in step 204.

The periodic benefit amount to be paid in each month the person remains disabled throughout the benefit period is determined in step 206. The present value of the periodic benefit payments accounting for the probability of receiving a benefit and discounting for interest is determined in step 208. The present value of the periodic benefit payments is multiplied by the probability that an individual becomes disabled in order to determine the claim cost associated with the periodic benefit payments in step 210, and the probability that the person is disabled according to the definition until the end of the benefit period is determined in step 212.

The lump sum benefit amount to be paid at the end of the benefit period is determined in step 214, and the present value of the lump sum benefit discounting for interest is calculated in step 216. The claim cost of the lump sum benefit is calculated in step 218 by multiplying the value of the probability that an individual becomes disabled and remains disabled by the probability the person is disabled according to the definition until the end of the benefit period, which is multiplied by the present value of the lump sum benefit discounting for interest.

The total claim cost for the periodic benefits and the final lump sum benefit are determined in step 220 by adding the claim cost associated with the periodic benefit payments and the claim cost of the lump sum benefit.

The total claim cost for the periodic benefits and the final lump sum benefit is adjusted to incorporate administrative cost and profit to determine final rate in step 220, the procedure then ends in step 222. The procedure described above may be performed in an aggregate form or by gender and age (individual ages or age bands); additionally the periodic benefit may be paid weekly, bi-weekly or semi-monthly.

Figure 3:
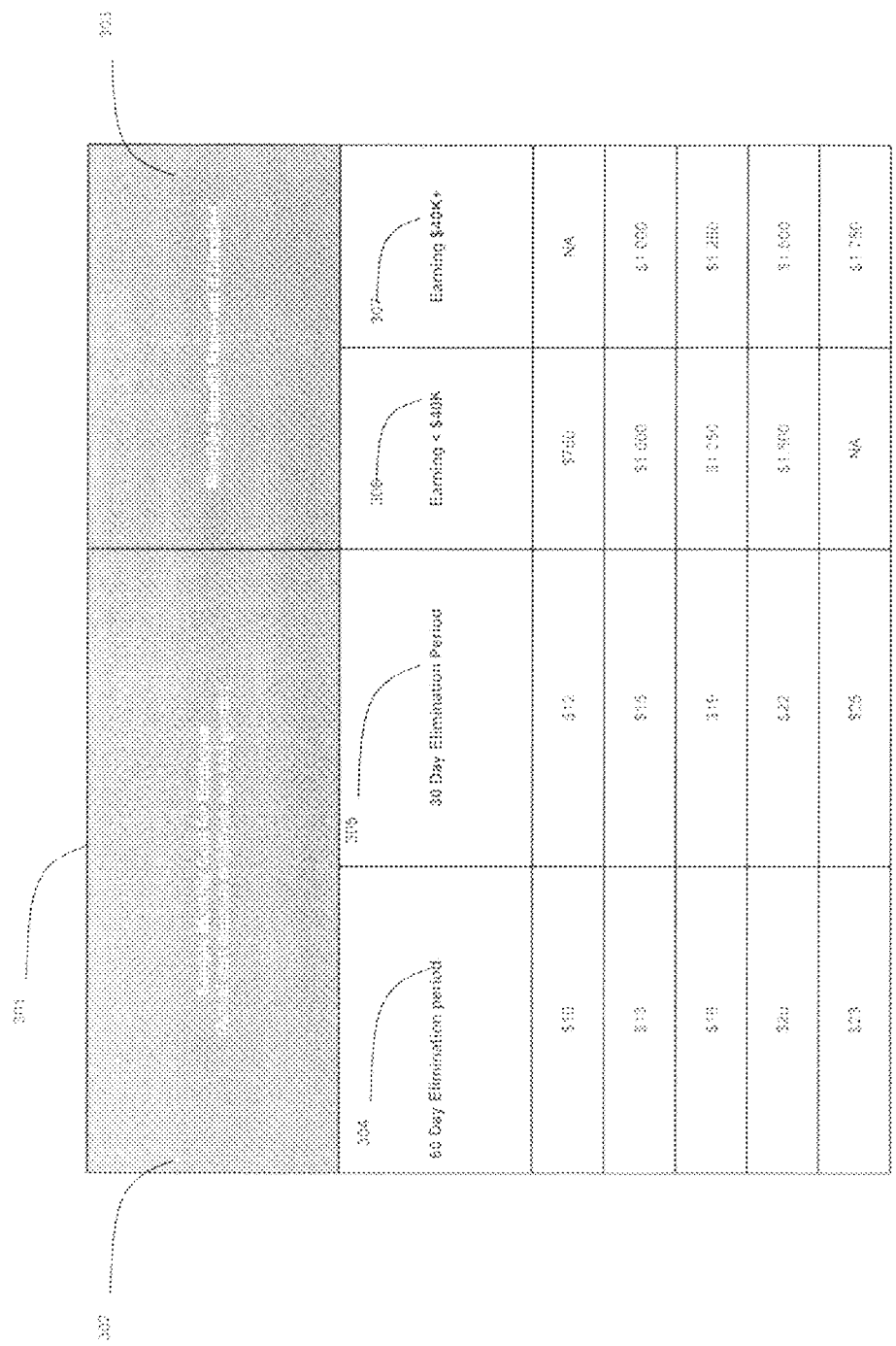
FIG. 3 depicts the cost of disability insurance for employees versus benefits received for insurance products with two possible elimination periods in accordance with an embodiment of the present invention.

FIG. 3 depicts a chart 301 detailing the cost of disability insurance for employees versus benefits received for an insurance product for an exemplary embodiment of the present invention with two possible elimination periods.

The chart 301 depicts a sample monthly cost 302 for 2 elimination periods, a 60 day elimination period 304 and a 30 day elimination period 305. Furthermore the chart 301 depicts the monthly benefits received if an individual is disabled 303. Two earning categories are presented for the monthly benefits received if an individual is disabled 303, namely, for individuals earning less than $40,000 annually 306 and for individuals earning more than $40,000 annually 307.

Figure 4:
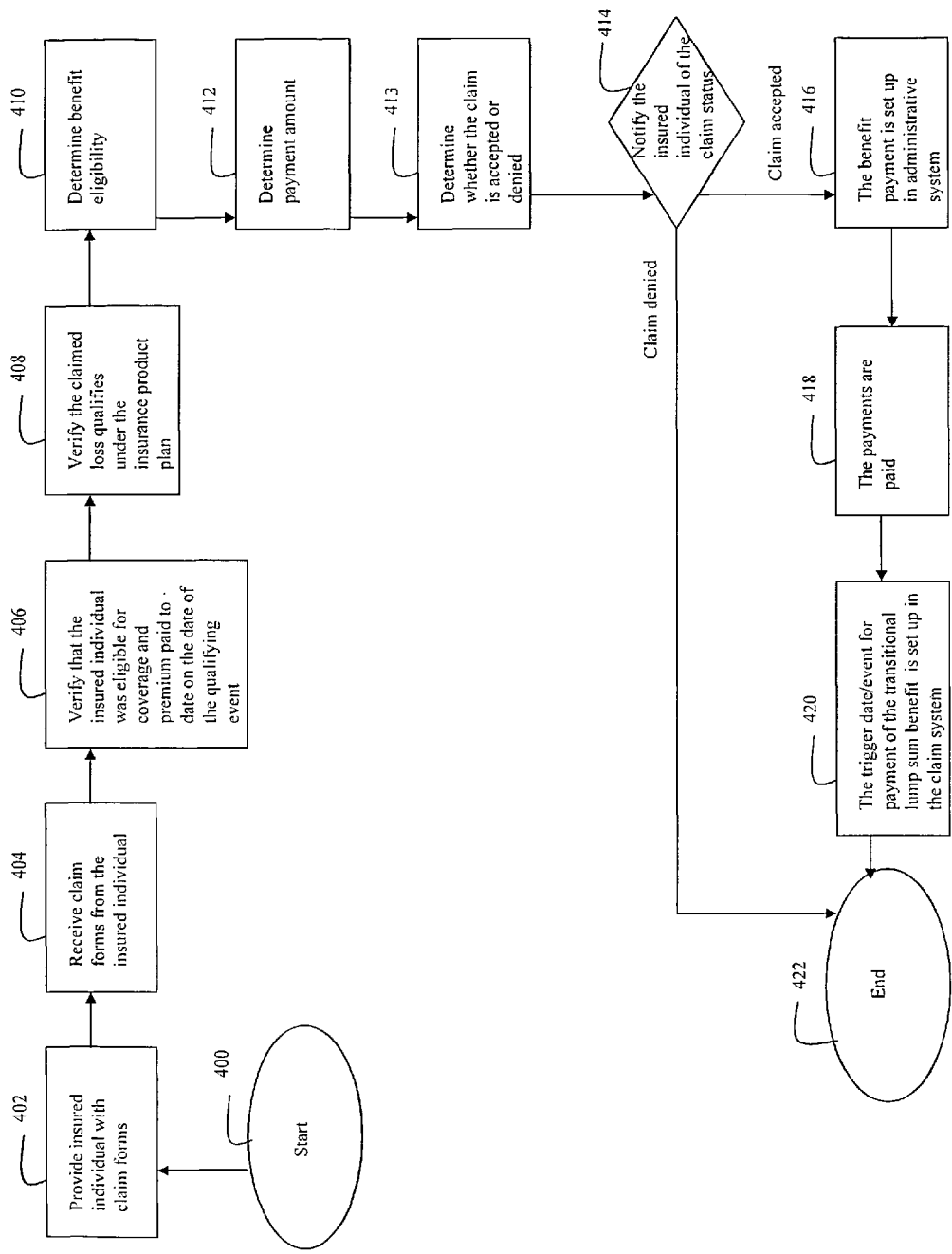
FIG. 4 is a flow chart depicting the steps taken when benefits are administered by an insurance provider to an insured individual for a simplified disability insurance product in accordance with an embodiment of the present invention.

FIG. 4 depicts the steps taken when benefits are administered by an insurance provider to an insured individual for a simplified disability insurance product structured in accordance with the present invention.

The procedure starts in step 400, and then the insured individual is provided with the insurance provider's claim form (form distributed by the insurance provider, employer or third party administrator) in step 402. Then, the claim is received by the insurance provider from the insured individual in step 404 on either the claim forms, telephonically or electronically to the insurance provider. The insurance provider then verifies that insured individual was eligible for coverage and premium has been paid to date on the date of the qualifying event in step 406. A claims team of the insurance provider verifies the claimed loss qualifies under the insurance product plan in step 408, the claims team then determines benefit eligibility in step 410, and determines payment amount in step 412. The insurance provider determines whether the claim is accepted or denied in step 413, whether the claim is accepted or denied the claim staff notifies the insured individual of the claim status in step 414, if the claim is denied steps 416, 418 and 420 are skipped and the procedure ends in step 422.

If the claim is accepted, the benefit payment is set up in administrative system in step 416. The payments are paid in step 418 via paper check or EFT (Electronic Funds Transfer). The lump sum payment may also be paid into an interest bearing or checking/draft bank account, set up by the carrier in the insured individual's name, which the insured individual can access immediately upon notification of set-up and at any time thereafter.

The trigger date/event for payment of the transitional lump sum benefit, is set up in the claim system, in step 420 and the procedure ends in step 422.

Furthermore, in order to receive benefits for a disability resultant from an accident, the loss may occur within a predetermined period of time from the accident (e.g. 90 days of the accident). Additionally, a predetermined amount may be due upon dismemberment or the loss of sight or hearing.

This insurance product may be extended to include coverage for seriously debilitating or life threatening diseases, such as cancer, heart attacks, strokes or other specified conditions. If benefits are extended for such coverage, in the event of a diagnosis of cancer, the insured individual is paid upon the first occurrence of the disease. If a recurrence of the disease occurs, a benefit is paid to the insured individual diagnosed with the reoccurrence of cancer, if the first occurrence benefit was paid under the policy of the insurance product, provided they continue to pay premiums. Additionally, benefits may be offered for: only one reoccurrence of any type of cancer, only one reoccurrence of same type as the initial diagnosis, or an unlimited number of reoccurrences of any type of cancer.

Recurrence may be considered as the reappearance of the same type of cancer as the positive diagnosis under the first occurrence benefit, provided a two year treatment-free period (this does not pertain to maintenance and follow-up visits) has passed since the first occurrence benefit payment.

Moreover, if the insured individual lives with the cancer for 24 months following receipt of a positive diagnosis under the first occurrence benefit, the insured individual is paid a lump sum and further coverage may be terminated. The insured individual may also choose a beneficiary to receive a lump sum upon the insured individual's death, if the individual dies within the 24 months following receipt of the positive diagnosis. The insurance product may be structured to include this feature in addition to the lump sum payment upon the 24 months survival period lump sum payout, or as an alternative option to the 24 months survival period lump sum payout. Even though the above example describes a 24 month time period, this is done for illustrative purposes only, any time period shorter or longer, maybe used without departing from the spirit of the present invention.

In the preferred embodiment of the present invention the insurance product may also include a wellness benefit. The wellness benefit pays a benefit amount each calendar year. The insured individual will be covered for one cancer screening test these may include: bone marrow testing, CA15-3 (cancer antigen 15-3 blood test for breast cancer), CA125 (cancer antigen 125 blood test for ovarian cancer), CEA (carcinoembryonic antigen blood test for colon cancer), chest x-ray, colonoscopy, flexible sigmoidoscopy, hemocult stool analysis, mammography, pap smear, PSA (Prostate Specific Antigen blood test for prostate cancer) and Serum Protein Electrophoresis (test for myeloma). A proof of service may be required at the time of the claim in order to receive the appropriate benefit.

If an insured individual is not satisfied with the provided diagnosis, the insured individual may seek diagnosis from another physician. The insurance product may also include second opinion coverage. The second opinion coverage may not necessitate proof of service. A second opinion will be covered if it is obtained from a physician or specialist not in the same practice with the physician rendering the original diagnosis.

Since a variety of growths may be conceived of as being cancerous, the insurance product will utilize a definition of cancer outlined in the policy agreement signed by the insurance provider and the insured individual. One applicable definition for cancer is the presence of a malignancy characterized by the uncontrolled and abnormal growth and spread of malignant cells in any part of the body. This may include Hodgkin's Disease, leukemia, lymphoma, carcinoma, sarcoma or malignant tumor. It may not include other conditions which may be considered pre-cancerous, including, but not limited to: leukoplakia, actinic keratosis, carcinoid, hyperplasia, polycythemia, nonmalignant melanoma, moles, basal cell carcinoma or similar diseases or lesions. The definition of cancer does not necessarily include Carcinoma in Situ.

Figure 5:
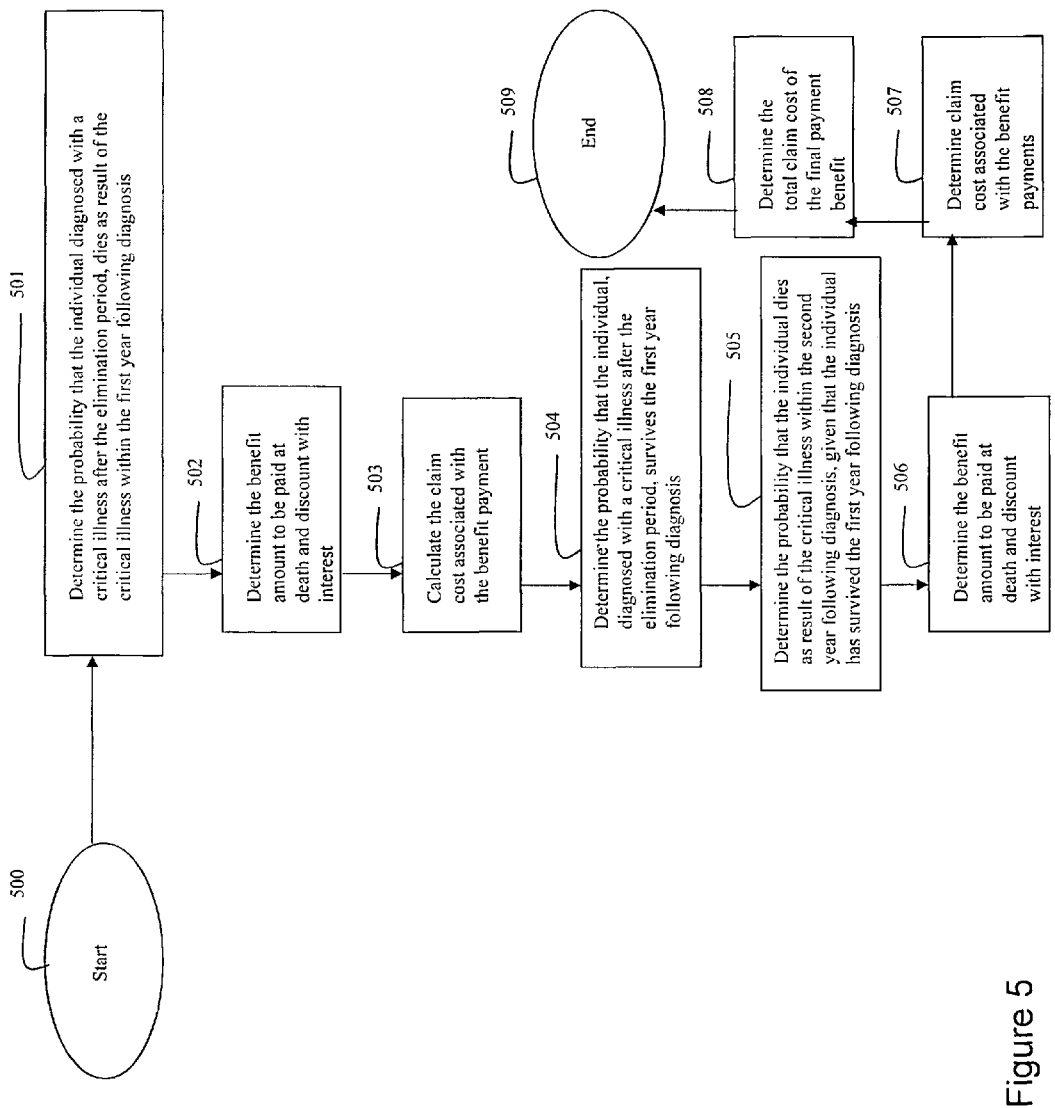
FIG. 5 is a flow chart depicting the steps taken when pricing a critical illness final payment benefit according to one pricing plan in accordance with an embodiment of the present invention.

FIG. 5 depicts the steps taken when pricing a critical illness final payment benefit in accordance with one pricing plan.

The procedure starts in step 500, then the probability that the individual diagnosed with a critical illness after the elimination period, dies as result of the critical illness within the first year following diagnosis is determined in step 501, the benefit amount to be paid at death and discount with interest is determined in step 502. The claim cost associated with the benefit payment is calculated in step 503 by multiplying the probability that the individual, diagnosed with a critical illness after the elimination period, dies as result of the critical illness within the first year following diagnosis by the benefit amount to be paid at death and discount with interest.

The probability that the individual, diagnosed with a critical illness after the elimination period, survives the first year following diagnosis is determined in step 504. The probability that the individual dies as result of the critical illness within the second year following diagnosis, given that the individual has survived the first year following diagnosis is determined in step 505.

Subsequently, the benefit amount to be paid at death and discount with interest is determined in step 506. The claim cost associated with the benefit payments is determined in step 507 by multiplying the probability that the individual, diagnosed with a critical illness after the elimination period, survives the first year following diagnosis by the probability that the individual dies as result of the critical illness within the second year following diagnosis as further multiplied by the benefit amount to be paid at death and discount with interest.

Finally, the total claim cost of the final payment benefit is determined in step 508 by adding the claim cost associated with the benefit payment calculated in step 503 and the claim cost associated with the benefit payments calculated in step 507 the procedure then ends in step 509.

Figure 6:
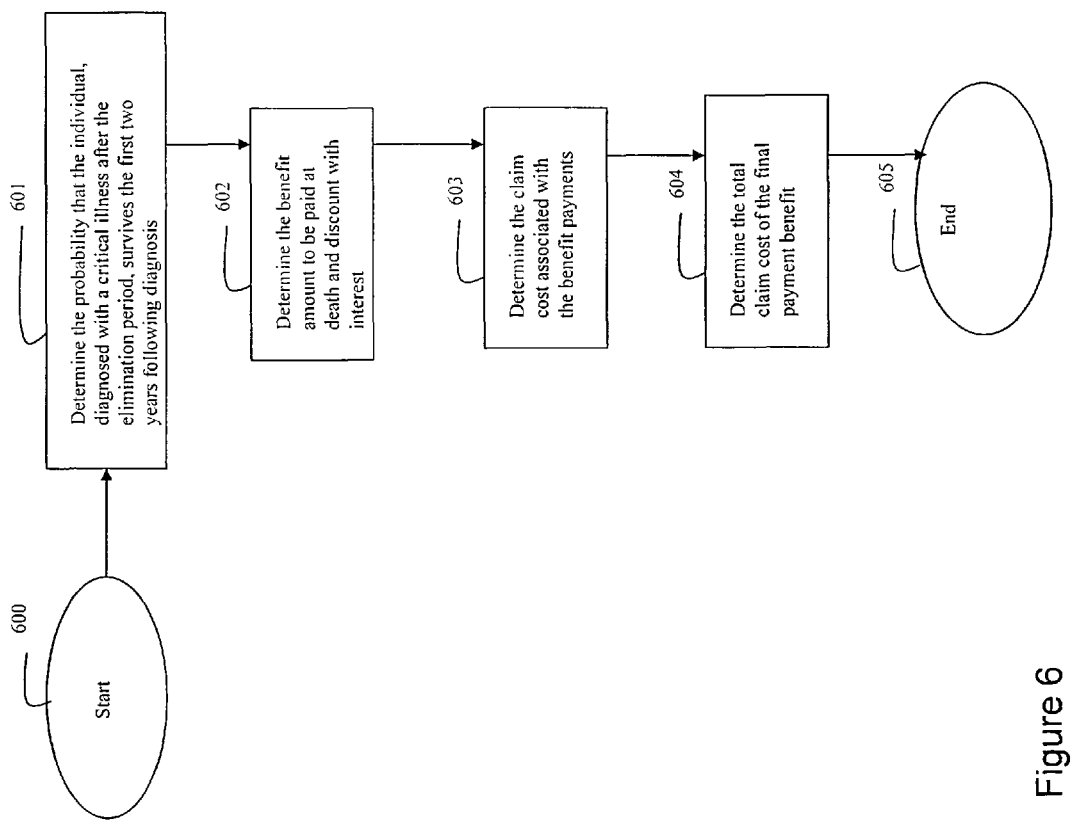
FIG. 6 is a flow chart depicting the steps taken when pricing a critical illness final payment benefit according to a second pricing plan in accordance with an embodiment of the present invention.

FIG. 6 depicts the steps taken when pricing a critical illness final payment benefit according to a second pricing plan.

The procedure starts in step 600, then the probability that the individual, diagnosed with a critical illness after the elimination period, survives the first two years following diagnosis is determined in step 601, the benefit amount to be paid at death and discount with interest is then determined in step 602. Finally, the claim cost associated with the benefit payments is determined in step 603 by multiplying the probability that the person, diagnosed with a critical illness after the elimination period, survives the first two years following diagnosis by the benefit amount to be paid at death and discount with interest, the total claim cost of the final payment benefit is then determined in step 604, in part using the claim cost associated with the benefit payments, the procedure then ends in step 605.

Figure 7:
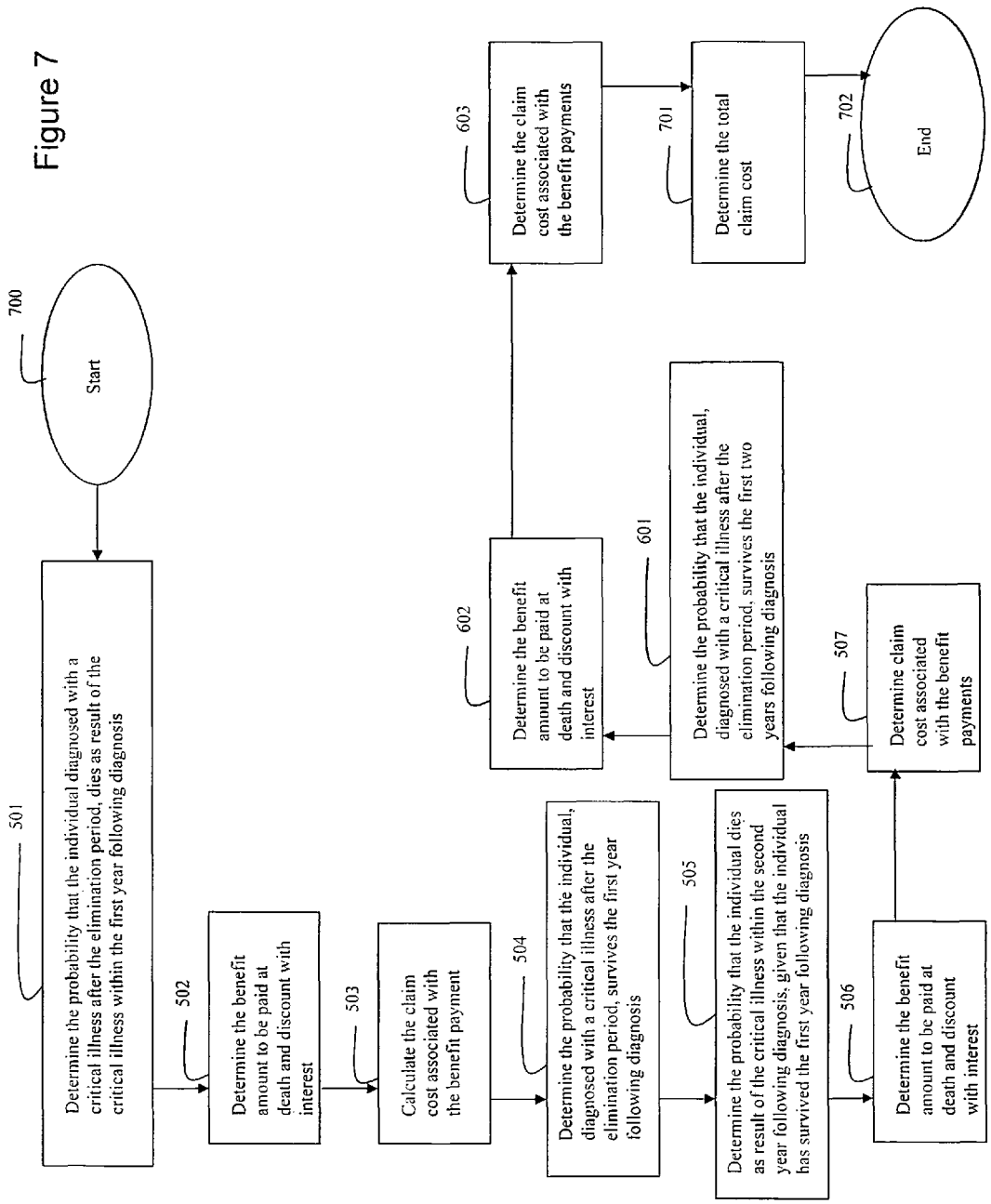
FIG. 7 is a flow chart depicting the steps taken when pricing a critical illness final payment benefit according to a third pricing plan in accordance with an embodiment of the present invention.

FIG. 7 depicts the steps taken when pricing a critical illness final payment benefit according to a third pricing plan.

The procedure starts in step 700, first, the probability that the individual, diagnosed with a critical illness after the elimination period, dies as result of the critical illness within the first year following diagnosis is determined in step 501, the benefit amount to be paid at death and discount with interest is determined in step 502. The claim cost associated with the benefit payment is calculated in step 503 by multiplying the probability that the person, diagnosed with a critical illness after the elimination period, dies as result of the critical illness within the first year following diagnosis by the benefit amount to be paid at death and discount with interest.

The probability that the individual, diagnosed with a critical illness after the elimination period, survives the first year following diagnosis is determined in step 504. The probability that the individual dies as result of the critical illness within the second year following diagnosis, given that the individual has survived the first year following diagnosis is determined in step 505.

Subsequently, the benefit amount to be paid at death and discount with interest is determined in step 506. The claim cost associated with the benefit payments is determined in step 507 by multiplying the probability that the individual, diagnosed with a critical illness after the elimination period, survives the first year following diagnosis by the probability that the individual dies as result of the critical illness within the second year following diagnosis as further multiplied by the benefit amount to be paid at death and discount with interest.

The probability that the individual, diagnosed with a critical illness after the elimination period, survives the first two years following diagnosis is determined in step 601, the benefit amount to be paid at death and discount with interest is then determined in step 602. Even though step 601 describes a 2 year time period this is done for illustrative purposes only, any time period shorter or longer, maybe used without departing from the spirit of the present invention. Next, the claim cost associated with the benefit payments is determined in step 603 by multiplying the probability that the individual, diagnosed with a critical illness after the elimination period, survives the first two years following diagnosis by the benefit amount to be paid at death and discount with interest. The total claim cost is then determined in step 701 by adding the claim cost associated with the benefit payments determined in step 507 with the claim cost associated with the benefit payments determined in step 603 and the claim cost associated with the benefit payments determined in step 503. The procedure then ends in step 702.

Figure 8:
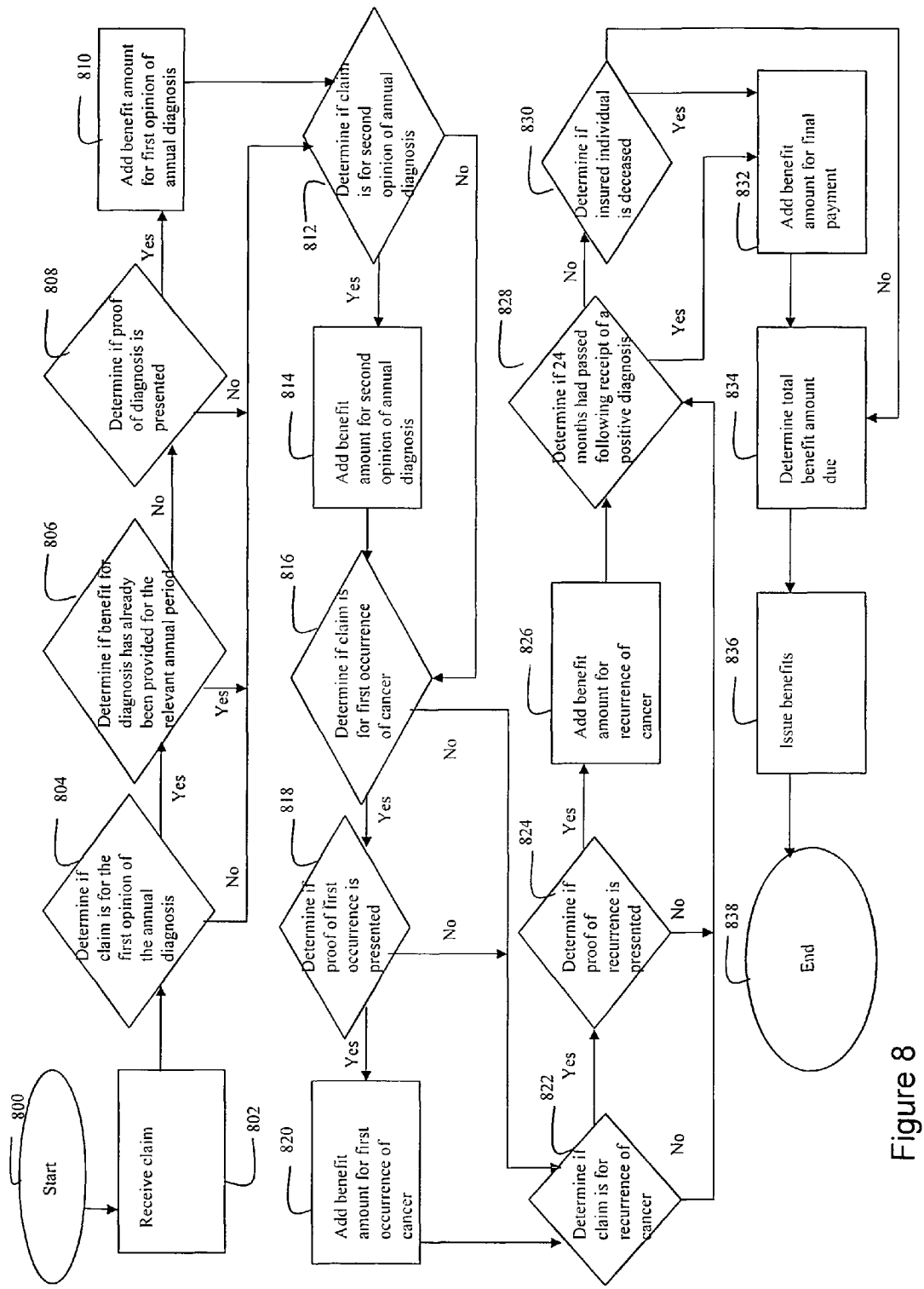
FIG. 8 is a flow chart depicting the steps taken when benefits are administered for an insurance product with cancer coverage in accordance with an embodiment of the present invention.

FIG. 8 depicts the steps taken when benefits are administered by an insurance provider to an insured individual for cancer coverage in accordance with one embodiment of the present invention.

The procedure starts in step 800, then, a claim is received in step 802. Then, in step 804, it is determined whether the claim is for the first opinion of the annual diagnosis. If the claim is not for the first opinion of the annual diagnosis steps 806, 808, and 810 are skipped and step 812 is performed. If the claim is for the first opinion of the annual diagnosis it is determined whether the benefit for the diagnosis has already been provided for the relevant annual period in step 806. If diagnosis benefits have already been provided within the relevant annual period steps 808 and 810 are skipped and step 812 is performed. If diagnosis benefits have not been provided within the relevant annual period, it is determined whether proof of diagnosis is presented in step 808.

If proof of diagnosis is not presented step 810 is skipped and step 812 is performed. If proof of diagnosis is presented the benefit amount for the first opinion of the annual diagnosis is added in step 810. Next, it is determined if the claim is for the second opinion of the annual diagnosis in step 812. If the claim is not for the second opinion of the annual diagnosis step 814 is skipped and step 816 is performed. If the claim is for the second opinion of the annual diagnosis, a benefit amount for the second opinion of the annual diagnosis is added in step 814.

Subsequently, it is determined if the claim is for the first occurrence of cancer in step 816, if the claim is not for the first occurrence of cancer steps 818 and 820 are skipped and step 822 is performed. If the claim is for the first occurrence of cancer, it is determined if proof of first occurrence is presented in step 818. If proof of first occurrence is not presented, step 820 is skipped and step 822 is performed, if proof of first occurrence is presented the benefit amount for the first occurrence of cancer is added in step 820.

Next, it is determined if the claim is for a recurrence of cancer in step 822, if the claim is not for a recurrence of cancer steps 824 and 826 are skipped, and step 828 is performed. If the claim is for a recurrence of cancer it is determined if proof of recurrence is presented in step 824, if proof of recurrence is not presented step 826 is skipped and step 828 is performed. If proof of recurrence is presented, a benefit amount for recurrence of cancer is added in step 826.

It is determined if 24 months had passed following receipt of a positive diagnosis in step 828, if 24 months had passed following receipt of a positive diagnosis step 830 is skipped and step 832 is performed. If 24 months had not passed following receipt of a positive diagnosis it is determined if the insured individual is deceased in step 830. Even though the above steps describe a 24 month time period this is done for illustrative purposes only, any time period shorter or longer, maybe used without departing from the spirit of the present invention. If the insured individual is not deceased step 832 is skipped and step 834 is performed, if the insured individual is deceased the benefit amount for the final payment is added in step 832. Next, the total amount of benefits due is determined in step 834 by adding all of the benefits due for the various benefit amounts determined through the procedure described above, the benefits are then issued in step 836 and the procedure ends in step 838.

The insurance product may be structured to offer a variety of coverage amounts. As just one example, the first occurrence benefits may provide coverage of up to $10,000, $25,000, $50,000 (to be priced in units of $1,000), second opinion benefits may provide coverage of up to $1,000 (to be priced in units of $500) and final payment benefits may provide coverage of up to $10,000 (to be priced in units of $1,000). Additionally, a limit may be set on the reoccurrence benefit of up to 25% of first occurrence benefit amount (to be priced in units of $250).

The above example simply illustrates one scenario of the present invention and should not serve to limit the scope of the present invention. More specifically, the specificity of the example should not serve to limit the invention to the dollar amounts or percentage listed in the example above, as these values can vary from each generated disability insurance product of the present invention.

It is possible that in order to be able to provide cancer coverage for the elderly (or other higher risk groups) at the same rate as for groups with a lower risk, benefits may be reduced for these higher risk groups. Additionally, a waiting period of 30 days from the effective date of the policy may be introduced, thus the coverage will not begin under the policy until after 30 days of the policy effective date. A spouse or child coverage may be added to the policy for the relevant dependents for an insured individual. A child may be included in the policy up until the age of 19, or 23 if the child is in school. Spouse coverage may be available for a spouse under the age of 85. However, various ages may be used without departing from the spirit of the present invention.

Coverage under the insurance product, which includes the cancer coverage, may terminate on the first of the month following the payment of the final benefit (whether for death or upon the completion of the 24 month period after the initial diagnosis) or reoccurrence benefit. However, spouse and/or child coverage may continue if a spouse and/or child continuation provision is implemented.

Even though the above example describes a 24 month time period, this is done for illustrative purposes only, any time period shorter or longer, maybe used without departing from the spirit of the present invention.

If the spouse of an insured individual is covered under the insurance product and the insured individual passes away, the coverage may terminate due to payment of the first occurrence benefit (or the reoccurrence benefit) for the insured individual's critical illness.

The spouse of an insured individual may request in writing to continue his or her coverage (and the coverage of the insured individual's dependent children who were covered by the insurance product). The insurance provider may require the spouse's request and premiums to continue coverage within a predetermined period of time (e.g. 31 days of the premium due date following the death of the insured individual or first occurrence benefit or reoccurrence benefit payment).

Solely for the purpose of continuing the coverage, the spouse will be considered the insured individual. However, this will not continue the spouse's or any of the dependent children's coverage beyond a date the coverage would normally cease under the dependent termination provision, or the premium due date following the date the spouse remarries. If the reoccurrence benefit is included in the insurance product the reoccurrence benefit option is used. If the reoccurrence benefit option is not included, the first occurrence benefit is used.

The pricing of an insurance product including the cancer coverage may be priced based on: gender, whether the insured individual is a smoker, or based on family rates.

The insurance product may also not provide benefits for certain exclusions, these exclusions may apply to:

a) Any disease, sickness or injury, except as expressly stated in the insurance product policy;

b) Critical illness which is diagnosed by the insured individual or a member of the insured individual's immediate family;

c) Critical illness which is contracted, or critical injury which occurs, as a result of:

1) War or act of war (whether declared or undeclared);

2) Service in the armed forces or units auxiliary thereto; or d) Critical illness which is contracted occurs or is diagnosed:

1) Prior to the insured individual's effective date of coverage; or

2) During the waiting period.

Where proof of critical illness and examinations are required, the diagnosis submitted for a claim must be made in the United States, and provided by an attending physician licensed to practice in the United States. If the insured individual fails to submit proof satisfactory to the insurance provider that he or she has a critical illness, or refuses to be examined by a physician as may be required by the insurance provider, then no critical illness benefit will be payable.

Although, the diseases coverage has been described above in terms of cancer, the benefits may be extended to any other debilitating or life threatening diseases without departing from the spirit of the present invention.

Figure 9:
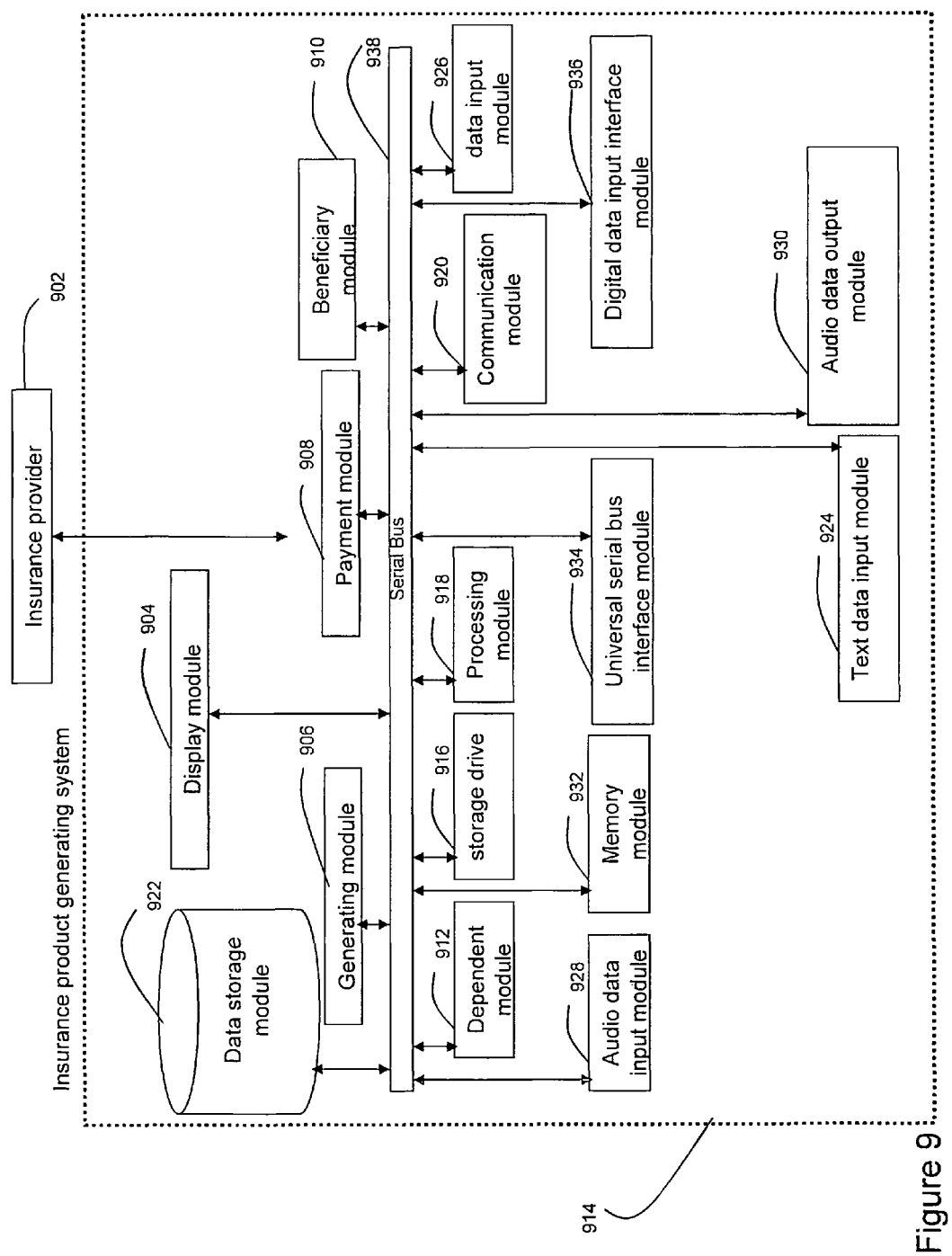
FIG. 9 is a diagram depicting the system on which the methods of the present invention may be implemented in accordance with an embodiment of the present invention.

FIG. 9 depicts a system on which the methods of the present invention may be implemented. The present invention relates to an improved voluntary disability product system, apparatus and method which includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

Network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least an insurance subscriber database and an insurance database. In one embodiment, database software creates and manages these databases. Insurance related calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as interest rates, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software. Suitable computer program code may be provided for performing numerous functions such as providing to an individual a disability insurance product, generating a disability insurance product contract, providing coverage for at least one disability defined in the insurance product contract, making periodic payments to the individual in the instance of a disability as defined in the insurance product contract, and making a payment upon the expiration of the periodic payments. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

The insurance product generating system 914 would generally be used by an insurance provider 902 however the system may be operated by any individual or organization offering an insurance product as outlined in the present specification without departing from the spirit of the present invention. All of the modules described herein are operably interconnected via a bi-directional connection with a central serial bus 938. The serial bus 938 serves to receive information from every single module, as well as to transmit information from one module to another. The insurance product generating system 914 comprises: a display module 904, and a generating module 906. The generating module is used for generating an insurance product contract, wherein the insurance product contract provides coverage to an individual or group for at least one event defined in the insurance product contract (e.g. disability, critical illness, cancer).

The insurance product generating system 914 additionally includes a payment module 908 for making periodic payments to an insured individual or group for a predetermined period of time in the instance of disability or critical illness or any other event covered by the insurance product and for making a payment of a predetermined sum upon the expiration of the predetermined period of time.

The system further comprises a beneficiary module 910 for choosing a beneficiary to receive payments from the insurance provider in the instance of an insured individual's death. Furthermore, the system comprises a dependent module 912 for offering an insurance product structured according to the methods of the present invention to dependents of an individual eligible for the insurance product described herein.

Additionally, the insurance product generating system 914 includes: a storage drive 916 for receiving data stored on an optical disc, a processing module 918 for processing digital data received by and contained in the insurance product generating system 914, a communication module 920 for bi-directional communication with external and telecommunications systems, a data storage module 922 for storing and managing digital information, a text data input module 924 for inputting data in the form of text, and a data input module 926 for converting to digital format documents and images and inputting them into the insurance product generating system 914.

Finally, the insurance product generating system 914 includes: an audio data input module 928 for receiving and inputting audio information, an audio data output module 930 for outputting data in audio format (i.e. recorded speech, synthetically generated speech from digital text, etc), a memory module 932 for temporarily storing information as it is being processed by the processing module 918, a universal serial bus interface module 934 for receiving and transmitting data to and from devices capable of establishing a universal serial bus connection, and a digital data input interface module 936 for receiving data contained in digital storage devices (e.g. floppy disk, zip drive, 8 mm digital tape, etc).

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

The insurance product disclosed herein may be offered to small companies (i.e. companies with 2-9 employees); in such instances the insurance provider may require that all eligible employees participate in the plan in order to offer the company a group rate. A mid-size small business (i.e. companies with 10-99 employees) or any larger business (i.e. companies with more than 99 employees may face a limit on the minimum amount of employees required to participate in the plan (e.g. 75% of eligible employees required to participate) in order for the company to receive group rates. Additionally, a waiting period (e.g. 30 days, 60 days, 90 days, etc) may be assigned before an employee or member of a sponsoring association or affinity group becomes eligible to receive coverage under the insurance product of the present invention.

The insurance product may also include a benefit reduction schedule for older insured individuals (e.g. 35% at ages 65, 70, & 75 and 25% at ages 80, 85, 90, & 95). It is conceivable that some disability causing circumstances may not be covered under the insurance product or invalidate coverage for an otherwise covered disability, such circumstances include: sickness or disease and any and all medical treatment in connection therewith, any infection (except a puss-forming infection of an accidental cut or wound), any injury received while in the armed services of a country at war or engaged in an armed conflict, any intentionally self-inflicted injury, suicide or suicide attempt (while sane or insane), an injury received while attempting or being engaged in a felony, an injury received while being engaged in an illegal occupation, drugs taken whether ingested or injected, unless as prescribed or administered by a physician, injured person's intoxication, and injury received in the course of doing work for pay or profit. However, the above list should not be considered exhaustive, as other circumstances, which may disqualify coverage under the insurance product may become apparent upon the implementation of the present invention.

The present invention can be provided for distribution in multiple markets, and is capable of being manufactured for issuance as an individual or group policy form. Alternatively, the present invention can be manufactured and sold through the workplace as an employer provided benefit, a voluntarily purchased product, or a combination of both. Further, the present invention can be manufactured for distribution by financial planners and insurance agents. It can also be manufactured for distribution on a direct basis with an endorsement by a sponsoring association (e.g. an affinity group). The present invention can also be utilized for direct distribution in retail environments like banks, pharmacies, department stores, and the like. The present invention may be further utilized for distribution directly to consumers (without the presence of a sponsoring association or affinity group).

An individual can purchase the present invention by paying one or more premium payments as is known in the art. For example, an individual can purchase a contract in accordance with the present invention by paying a series of levels of periodic premium payments.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims.

Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for providing a disability insurance product comprising:
    a storage device having data relating to an insurance product provided under an insurance policy, and periodic payments provided to an insured individual;
    a processing module operatively coupled to the storage device, said processor configured to read said data relating to an insurance product, and periodic payments provided to the insured individual, the storage device storing modules utilized by the processor, the modules comprising:
    a generating module for generating an insurance product which provides for: periodic payments in substantially equal amounts to an insured individual in the event of receipt of data indicative of either a disability of the insured individual or a diagnosis of the individual with an illness specified in the policy-related data stored in the storage device, said periodic payments responsive to the disability of the insured individual continuing for a predetermined period of time, provided the insured individual remains disabled and said periodic payments responsive to the data indicative of the diagnosis continuing for the predetermined term provided the insured individual remains living; and a payment on a periodic basis for a first medical opinion as to a diagnosis of the illnesses specified in the policy-related data stored in the storage device; and
    a payment module for making the periodic payments to the insured, wherein the payment module is further configured to make a transition payment in a finite amount equal to a multiple of the amount of one of the periodic payments to the insured individual responsive to receipt of data indicative of the disability of the insured individual upon the expiration of the predetermined period of time for said periodic payments, provided that the insured remains disabled at said expiry of said predetermined period of time and to make the transition payment to the insured individual responsive to receipt of data indicative of the diagnosis upon the expiration of the predetermined period of time, provided that the insured individual remains living.

2. The system of claim 1 wherein the modules further comprise:
    a beneficiary module for choosing a beneficiary to receive payment from the insurance provider in the instance of the insured individual's death during the predetermined term.

3. A computer implemented method for providing to an individual a disability insurance product comprising the steps of:
    generating a disability insurance product contract using a generating module and storing data relating to the disability insurance product in a storage device;
    providing coverage for at least one disability defined in the insurance product contract and for at least one illness defined in the insurance product contract in accordance with the data relating to the disability insurance product stored in the storage device;
    making by a payment module in communication with the generating module periodic payments in substantially equal amounts to the insured individual in the instance of the at least one disability defined in the stored data relating to the insurance product contract, said periodic payments continuing for a predetermined period of time provided the insured individual remains disabled;

making payment by the payment module on a periodic basis for a first medical opinion as to a diagnosis of the at least one illness defined in the stored data relating to the insurance product contract;

making periodic payments by the payment module to the insured individual in the instance of the at least one illness defined in the stored data relating to the insurance product contract, said periodic payments continuing for the predetermined period of time provided the insured individual remains living;

making a transition payment by the payment module in a finite amount equal to a multiple of the amount of one of the periodic payments upon the expiration of the predetermined period of time for said periodic payments responsive to the disability, provided that the insured individual remains disabled at said expiry of said predetermined period of time; and making a transition payment by the payment module in a finite amount equal to a multiple of the amount of one of the periodic payments to the insured individual responsive to the diagnosis upon the expiration of the predetermined period of time, provided that the insured individual remains living.

4. The method of claim 3 wherein the periodic payments expire in the event of the death of the insured individual.

5. The method of claim 4 further comprising the step of:
choosing a beneficiary to receive payments from the insurance provider in the instance of the insured individual's death.

6. A computer implemented method for providing an illness insurance product comprising the steps of:
generating an illness insurance product contract using a generating module and storing data relating to the illness insurance product contract in a data storage device;
providing coverage for at least one illness defined in the stored data relating to the insurance product contract;
making a payment by a payment module in communication with the generating module on a periodic basis for a first medical opinion as to a diagnosis of the at least one illness specified in the policy;
making periodic payments by the payment module in substantially equally amounts to an insured individual in the instance of data indicative of a diagnosis of the individual with the at least one illness defined in the insurance product contract related data, said periodic payments continuing for a predetermined period of time provided the insured individual remains ill with the illness; and
making a payment by the payment module of a predetermined single sum in a finite amount equal to a multiple of the amount of one of the periodic payments upon the expiration of the predetermined period of time for said periodic payments, provided that data is received indicative that the insured individual remains ill with the illness defined in the stored data relating to the insurance contract and living at said expiry of said predetermined period of time.

7. The method of claim 6, wherein the payment on a periodic basis for a first medical opinion is for an annual first opinion examination by a physician; and further comprising providing coverage for a second opinion examination by another physician.

8. The method of claim 6 and further comprising the step of:
choosing a beneficiary to receive payments from the insurance provider in the instance of the insured individual's death.

9. The method of claim 8 wherein the beneficiary receives the payment of a predetermined single sum as well as an additional sum in the instance of the insured individual's death.

10. A system for providing an insurance product comprising:
a storage device having data relating to an insurance product, periodic payments provided to an individual in the event of diagnosis of the individual with an illness specified in an insurance product contract or disability of the individual, and a transition payment;
a processing module operatively coupled to the storage device, said processor configured to read said data relating to said insurance product, periodic payments provided to an insured individual in the event of diagnosis of the individual with an illness specified in the policy or disability of the individual, and a transition payment, the storage device storing modules utilized by the processor, the modules comprising:
a generating module for generating an insurance product contract which provides periodic payments of substantially equal amount to the insured individual in the event of an illness defined in the data relating to the insurance product contract and continuing for a predetermined period provided that the event of an illness under the data relating to the contract remains or in the event of receipt of data indicative of disability of the individual and continuing for the predetermined period and a payment on a periodic basis for a first medical opinion as to a diagnosis of the illness specified in the insurance contract; and
a payment module for determining periodic payments to said insured individual, determining a transition payment in a finite amount a multiple of the amount of the periodic payments payable upon the expiration of said periodic payments under the condition of receipt of data indicative that the insured individual remains disabled or that the event of an illness under the stored data relating to the contract remains at the expiry of said predetermined period, and outputting the determined payments.

11. The system of claim 10 wherein the illness is cancer.

12. The system of claim 10 wherein the transition payment is a predetermined single sum.

13. The system of claim 12 wherein the payment module provides for payment of the periodic payments and the transition payment to the insured individual.

14. The system of claim 10 wherein the periodic payments expire at death.

15. The system of claim 14 wherein the modules further comprise:
a beneficiary module for choosing a beneficiary to receive payments from said insurance provider in the instance of the insured individual's death.

16. The system of claim 10 wherein the modules further comprise:
a dependent module for offering said insurance product to said individual's dependents.

17. The system of claim 1 wherein the disability is at least one of the following: dismemberment, loss of hearing, and loss of sight.

18. The system of claim 1 wherein the disability is an event rendering the individual unable to perform essential duties of the individual's occupation and the earnings of the insured individual are less than a given percentage of pre-disability earnings over a given time interval.

19. The system of claim 1 wherein the given percentage of pre-disability earnings is 80%.

20. The system of claim 1, wherein the multiple is at least three times the amount of the periodic payments.

21. The system of claim 20, wherein the predetermined period of time is at least two years.

22. The system of claim 1, wherein the data stored in the storage device is configured for denial of payment for a medical opinion as to any illness other than the illnesses specified in the policy-related data stored in the storage device.

23. The system of claim 22, wherein the illnesses specified in the policy-related data stored in the storage device comprise a malignancy characterized by uncontrolled and abnormal growth and spread of malignant cells in any part of the body, comprising Hodgkin's Disease, leukemia, lymphoma, carcinoma, sarcoma and malignant tumor and excluding pre-cancerous conditions.

* * * * *